(12) United States Patent
Wang et al.

(10) Patent No.: US 12,124,431 B1
(45) Date of Patent: Oct. 22, 2024

(54) DATA MAINTENANCE

(71) Applicant: INTERNATIONAL BUSINESS MACHINES CORPORATION, Armonk, NY (US)

(72) Inventors: Zhao Yu Wang, Beijing (CN); Jing Wen Chen, Beijing (CN); Jing Ren, Beijing (CN); Yi Jie Ma, Beijing (CN); Wen Zhong Liu, Beijing (CN); Peng Hui Jiang, Beijing (CN); Andrew Nelson Wilt, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/333,937

(22) Filed: Jun. 13, 2023

(51) Int. Cl.
  *G06F 16/23* (2019.01)
  *G06F 16/2455* (2019.01)

(52) U.S. Cl.
  CPC ...... *G06F 16/2365* (2019.01); *G06F 16/2455* (2019.01)

(58) Field of Classification Search
  CPC .................. G06F 16/2365; G06F 16/2455
  See application file for complete search history.

(56) References Cited

U.S. PATENT DOCUMENTS

| | | | | |
|---|---|---|---|---|
| 8,375,177 B2* | 2/2013 | Gill | ................... | G11B 20/1883 714/42 |
| 8,918,400 B2 | 12/2014 | Belisle | | |
| 9,898,373 B2* | 2/2018 | Resch | ................. | G06F 11/1458 |
| 10,606,802 B2 | 3/2020 | Erdmann | | |
| 2007/0233947 A1* | 10/2007 | Coulson | .............. | G06F 12/0866 711/113 |
| 2010/0185921 A1* | 7/2010 | Meller | ................ | G06F 11/1433 714/763 |
| 2019/0361916 A1* | 11/2019 | Weaver | .................... | G06F 16/00 |
| 2020/0151104 A1* | 5/2020 | Yang | .................... | G06F 13/4282 |

(Continued)

OTHER PUBLICATIONS

Oracle Database, "Introduction to Database Replay," Oracle Database Testing Guide [Release 18], [accessed on Apr. 25, 2023], 3 pages, Retrieved from the Internet: <URL: https://docs.oracle.com/en/database/oracle/oracle-database/18/ratug/introduction-to-database-replay.html>.

(Continued)

*Primary Examiner* — Merilyn P Nguyen
(74) *Attorney, Agent, or Firm* — Daniel J Blabolil (57) ABSTRACT

According to one embodiment, a computer-implemented method, a computer system, and a computer program product for data maintenance is provided. The present invention may include receiving, by one or more processing units, a maintenance request for a first data set stored in a first non-transient storage; copying, by one or more processing units, the first data set into a second non-transient storage as a second data set during a copy phase in response to receiving the maintenance request; writing, by one or more processing units, update content indicated by an update request to the first data set into a first transient memory in response to receiving the update request during the copy phase; and updating, by one or more processing units, the second data set based on the written update content in the first transient memory during a write-back phase responsive to a completion of the copy phase.

17 Claims, 6 Drawing Sheets

(56) References Cited

U.S. PATENT DOCUMENTS

2021/0263802 A1    8/2021    Gottemukkula
2022/0129480 A1    4/2022    Motivala

OTHER PUBLICATIONS

Oracle, "Replaying Logged Transactions," [accessed on Apr. 25, 2023], Oracle Help Center [online], 2 pages, Retrieved from the Internet: <URL: https://docs.oracle.com/cd/E57185_01/EASOH/replaytransactions.html>.

Rajeshsetlem, et al., "Use read-only replicas to offload read-only query workloads," Microsoft Learn [article], Apr. 13, 2023 [accessed on Apr. 25, 2023], 13 pages, Retrieved from the Internet: <URL: https://learn.microsoft.com/en-us/azure/azure-sql/database/read-scale-out?view=azuresql>.

* cited by examiner

| Catalog status | Catalog data set name | Catalog data set status | Alternative data set name | Alternative data set status | Maintain phase | CF list module status |
|---|---|---|---|---|---|---|
| Maintmode /Normal mode | CATALOG.P ETUCAT1 | Read-write Read-only | CATALOG.PE TUCAT1.alt | Write Read-write | Copy phase Writeback phase Replay phase | Read-write Query-only |

(a)

| Data Set Name | Volume | Owner | Access time | VTOC | LENGTH | Other changed attributes |
|---|---|---|---|---|---|---|
| ABC.DB2.DATA.LOG1 | TEST01 | DB2PRI | 2021.08.24.12:24:36.000123 | TEST01.VTOC | 963,256 | ... |
| ... | | | | | | |

(b)

| Request ID | Request connector | Request Package | | | | Request time & timeout etc |
|---|---|---|---|---|---|---|
| 100102 | DB2DBWG | Data Set name | Operations: Delete/update/create | volume | Type etc | 2021.08.24.12:24:36.000123  10s |
| ... | | | | | | |

```
┌─────────────────────────────────────────────┐
│ IN RESPONSE TO RECEIVING ONE OR MORE UPDATE │
│ REQUESTS OR QUERY REQUESTS DURING WRITE-BACK│──501
│ PHASE, GENERATING A REQUEST LIST INCLUDING  │
│ THE RECEIVED ONE OR MORE UPDATE REQUESTS OR │
│             QUERY REQUESTS                  │
└─────────────────────────────────────────────┘
                      │
                      ▼
┌─────────────────────────────────────────────┐
│   WRITING THE REQUEST LIST IN THE FIRST     │──502
│             TRANSIENT MEMORY                │
└─────────────────────────────────────────────┘
                      │
                      ▼
┌─────────────────────────────────────────────┐
│ READING ONE OR MORE REQUESTS INCLUDED IN THE│
│ REQUEST LIST FROM THE FIRST TRANSIENT MEMORY│──503
│  IN RESPONSE TO COMPLETION OF THE WRITE-BACK│
│                   PHASE                     │
└─────────────────────────────────────────────┘
                      │
                      ▼
┌─────────────────────────────────────────────┐
│   PROCESSING THE ONE OR MORE REQUESTS WITH  │──504
│       RESPECT TO THE SECOND DATA SET        │
└─────────────────────────────────────────────┘
```

DATA MAINTENANCE

BACKGROUND

The present disclosure relates to data maintenance, and more specifically, to data maintenance in a distributed computer system.

A distributed computer system can be implemented by using computer cluster technology, which combines multiple computers to form a high-performance and high-availability system, and such a distributed computer system allows applications to run in parallel on all computers (i.e., computer cluster), thus improving processing speed and reliability. For example, Parallel Sysplex® is a distributed computer system of IBM® mainframes and allows a cluster of up to 32 systems (i.e., node) as a single system image (such as with z/OS®), wherein each node has respective resources such as processor, memory and storage, and communicates and cooperates through high-speed networks. In a reasonably deployed computer cluster, even if an individual node crashes, the whole system can still operate without being seriously affected, and the workload carried out on the crashed node can be automatically restarted by the remaining nodes in the system. Because of the above characteristics, computer cluster technology can be widely used in fields such as big data analysis, cloud computing, high-performance computing, and so on.

However, there is still a problem in data maintenance of a distributed computer system, that is, during data maintenance, the services of the system may be interrupted.

SUMMARY

According one embodiment of the present disclosure, a computer-implemented method for data maintenance is provided. In this method, a maintenance request for a first data set stored in a first non-transient storage can be received; the first data set can be copied into a second non-transient storage as a second data set during a copy phase in response to receiving the maintenance request; update content(s) indicated by an update request to the first data set can be written into a first transient memory in response to receiving the update request during the copy phase; and the second data set is updated based on the update content(s) in the first transient memory during a write-back phase responsive to a completion of the copy phase.

According to another embodiment of the present disclosure, a computer system for data maintenance is provided. The system comprises one or more processors, a memory coupled to at least one of the processors, and a set of computer program instructions stored in the memory. When executed by at least one of the processors, the set of computer program instructions perform the following actions: receiving a maintenance request for a first data set stored in a first non-transient storage; copying the first data set into a second non-transient storage as a second data set during a copy phase in response to receiving the maintenance request; writing update content(s) indicated by an update request to the first data set into a first transient memory in response to receiving the update request during the copy phase; and updating the second data set based on the update content(s) in the first transient memory during a write-back phase responsive to a completion of the copy phase.

According to another embodiment of the present disclosure, a computer program product for data maintenance is provided. The computer program product comprises a non-transitory computer-readable storage medium having program instructions embodied therewith. The program instructions are executable by a processor to cause the processor to perform the following actions: receiving a maintenance request for a first data set stored in a first non-transient storage; copying the first data set into a second non-transient storage as a second data set during a copy phase in response to receiving the maintenance request; writing update content(s) indicated by an update request to the first data set into a first transient memory in response to receiving the update request during the copy phase; and updating the second data set based on the update content(s) in the first transient memory during a write-back phase responsive to a completion of the copy phase.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure. In the drawings.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random-access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 1:
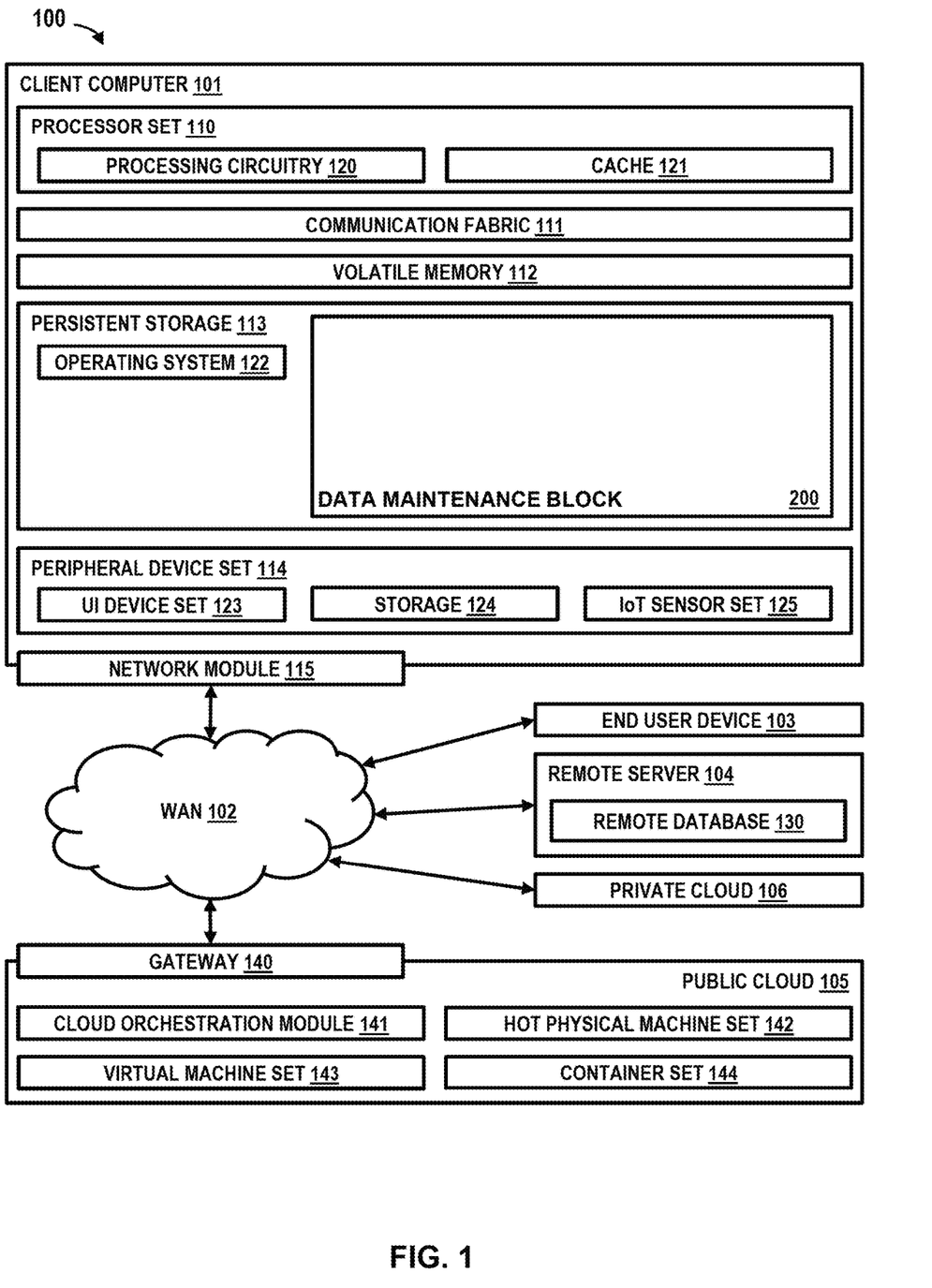
FIG. 1 illustrates an exemplary computing environment according to at least one embodiment in the present disclosure.

Computing environment 100 contains an example of an environment for the execution of at least some of the computer code involved in performing the inventive methods, such as data maintenance block 200. In addition to data maintenance block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby affect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random-access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows the writing of data, the deletion of data, and the rewriting of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is understood that the computing environment 100 in FIG. 1 is only provided for illustration purposes without suggesting any limitation to any embodiment of this invention, for example, at least part of the program code involved in performing the inventive methods could be loaded in cache 121, volatile memory 112 or stored in other storage (e.g., storage 124) of the computer 101, or at least part of the program code involved in performing the inventive methods could be stored in other local or/and remote computing environment and be loaded when need. For another example, the peripheral device set 114 could also be implemented by an independent peripheral device connected to the computer 101 through an interface. For a further example, the WAN may be replaced and/or supplemented by any other connection made to an external computer (for example, through the Internet using an Internet Service Provider).

A distributed computer system (such as Sysplex) is a cluster of several individual computers (i.e., nodes) deployed in the system. In order to access massive data of the whole distributed computer system, it is necessary to maintain data directory information for the distributed computer system, for example, through a file management service (such as Catalog service in z/OS®). The data directory information, as an index for data of the whole distributed computer system, can be stored in a form of dataset in a non-transient storage (such as a hard disk) in the distributed computer system. Such a dataset can be referred to as a Catalog dataset, which is used to index the requested data by the user in a distributed computer system and has a typical size of about several GBs. The requested data can be accessed by retrieving from the Catalog dataset stored in the distributed computer system.

However, as mentioned above, when data stored in a computer deployed in the distributed computer system is to be maintained, such as migrating the data to another storage, the data to be maintained or being maintained will not be accessible. Although some existing maintenance methods are usually performed during low workload periods (e.g., wee hours) in order to mitigate the adverse effects due to service interruption, however, in a case that the maintained data includes key data (such as data directory information), any interruption of service is unacceptable.

In view of the above problems, there exists a need for an improved data maintenance method, which can provide maintenance for the key data without interrupting services.

Figure 2:
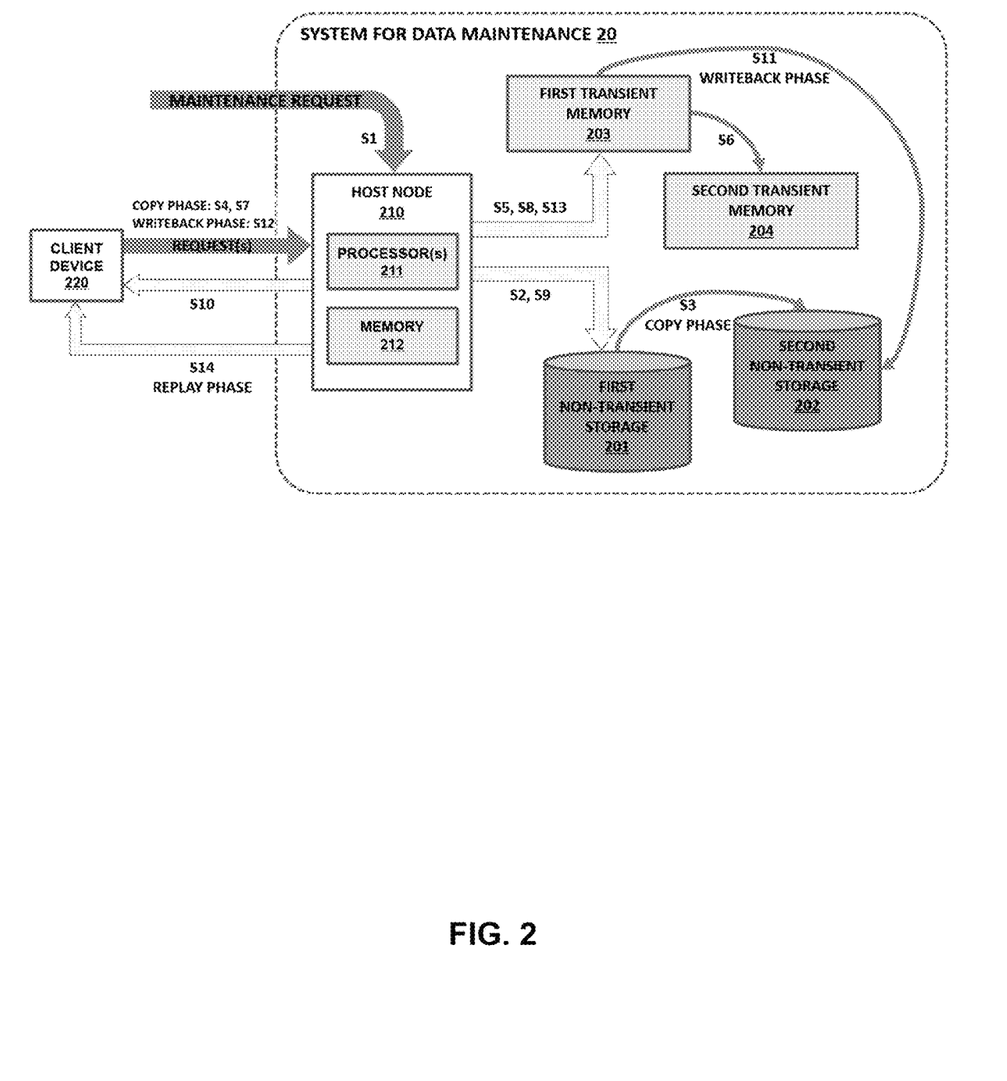
FIG. 2 illustrates an exemplary architecture of a system for data maintenance according to at least one embodiment in the present disclosure.

FIG. 2 shows an exemplary system for data maintenance according to an embodiment in the present disclosure. As shown in FIG. 2, a system 20 for data maintenance comprises a host node 210 including one or more processors 211, and a program memory 212 coupled to at least one of the processors, a first non-transient storage 201, a second non-transient storage 202, a first transient memory 203, and a second transient memory 204.

According to an embodiment in the present disclosure, the host node 210 can be configured to receive one or more requests including a maintenance request, an update request, a query request, or a combination thereof, from one or more user devices, such as a client device 220. The one or more processors 211 can work as a control module of a distributed computer system to coordinate nodes therein to work together. A set of computer program instructions can be stored in the program memory 212, which, when executed by at least one of the processors 211, perform a computer-implemented method for data maintenance, which will be described in detail below.

It should be noted that the system 20 can further comprise multiple nodes deployed therein, and FIG. 2 only shows a host node 210, a first non-transient storage 201, a second non-transient storage 202, a first transient memory 203, and a second transient memory 204 as exemplary nodes in the system 20, nodes in the system can communicate with each other. Also, according to an embodiment in the present disclosure, the system 20 can be a distributed computer system or a subsystem as a part of the distributed computer system. In addition, the client device 220 can be a node deployed in the system 20 or in a separate system from the system 20.

In addition, the non-transient storages 201 and 202, the transient memories 203 and 204, and the host node 210 can be physically separated from each other, as shown, or alternatively, any of the non-transient storages and the transient memories can be included in the host node 210 or another node in the system 20. According to an embodiment in the present disclosure, the non-transient storages 201 and 202 can be used to store key datasets such as a Catalog dataset including data directory information for the distributed computer system and/or other important data.

Figure 3:
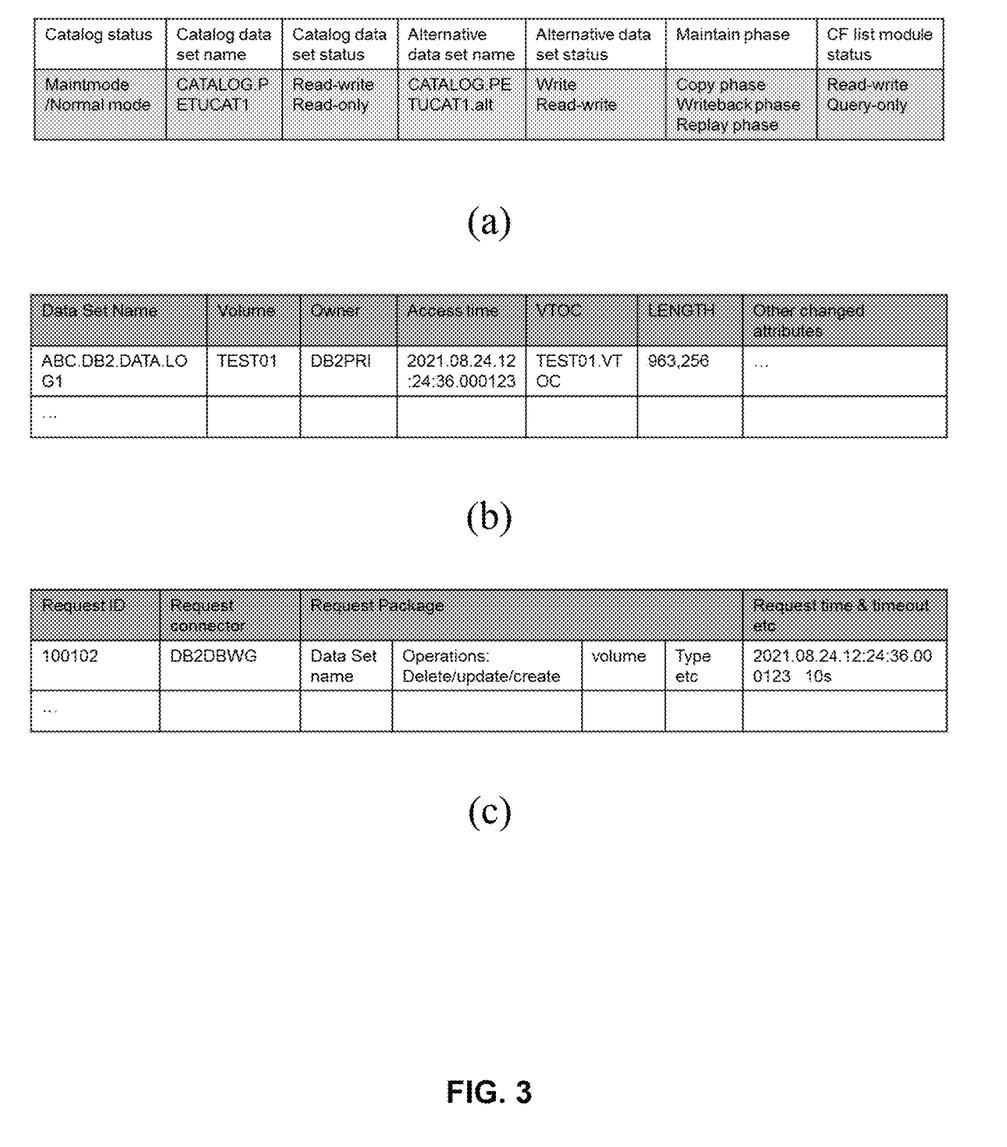
FIG. 3 depicts several types of exemplary files used in a system for data maintenance according to at least one embodiment in the present disclosure.

Herein, a host node of a distributed computer system can refer to a computer node that can operate and provide services independently. For example, in an embodiment in the present disclosure, the host node 210 can be responsible for managing data for the distributed computer system (including responding to data update requests or query requests, etc.) and initiating data maintenance for the distributed computer system and so on. As mentioned above, the distributed computer systems can use Catalog service to access data stored in the distributed computer systems, which provides a mechanism to allow users to share data among multiple nodes and ensure data consistency and high availability. FIG. 3 shows several types of files used in the Catalog service, which will be described in detail below.

In addition, the non-transient storages 201 and 202 can refer to a persistent (i.e., non-volatile) storage medium, characterized in that the stored data will not be lost due to system restart, power failure, or other short-term failures. Also, such non-transient storage can adapt specific storage formats and protocols to ensure the integrity and reliability of the data stored therein and thus can be used to store key data, such as configuration files, log records, and data directory information as mentioned above. Typical non-transient storage can include hard disk drive (HDD), solid-state drive (SSD), or cloud-based storage deployed in a distributed system.

On the contrary, transient memories 203 and 204 can refer to a medium for temporarily storing data, which is characterized in that the stored data will be emptied after the restart or power failure of the system, but such transient storage medium can access data at high speed, and thus usually used to store temporary data, such as variables during calculation or cached data during the execution of the program, to improve the processing speed of computation. Typical transient memory can include cache and random-access memory (RAM). In a distributed computer system, these transient memories 203 and 204 can be also referred to as Coupling Facility (CF), which are used as a high-speed shared memory between nodes to support the collaborative processing of the distributed computer system. Such CF can be configured with a processor and a cache, and to transmit data via high-speed link (such as optical fiber). According to an embodiment in the present disclosure, a CF can be used as a buffer for update information and a request queue, as will be described in detail below. Data stored in the non-transient storages 201 and 202 and the transient memories 203 and 204 can be accessed by the host node 210 or any one or more nodes in the distributed computer system.

In addition, FIG. 2 further shows arrows, which schematically represent data flows and operations, such as transmitting, receiving, reading, writing, and transferring data among related devices or apparatus. Some actions, steps, or operations in a process of data maintenance may not be shown by those arrows, and a same arrow may represent multiple actions/operations with respective labels, and these actions/operations may be different or in different phases (e.g., S5, S8, and S9 share a same arrow).

A method will be described illustratively below with reference to the FIG. 2, as shown in FIG. 2, the host node 210 can receive a maintenance request for a first data set stored in the first non-transient storage 201 (S1). For example, in order to upgrade the existing storage apparatus storing a key data set (e.g., a Catalog dataset), it is necessary to perform data migration from an original storage apparatus to a new storage apparatus. For this purpose, a user (e.g., an administrator of the distributed computer system or a user of the host node 210) can transmit the maintenance request to the host node 210, to initialize a data maintenance operation on the first data set.

Next, in response to receiving the maintenance request, one or more processors 211 of the host node 210 can control the first non-transient storage 201 to initialize copying of a first data set from the first non-transient storage 201 to the second non-transient storage 202 via a command (S2). According to an embodiment in the present disclosure, the host node 210 can switch a first data set to be maintained that is stored in the first non-transient storage 201 into a "copy phase" in response to receiving the maintenance request. For example, a status file recording the information about the first data set can be modified, to switch the first data set into the "copy phase". The status file can be stored in a node such as the host node 210 in the distributed computer system.

FIG. 3 (*a*) shows an example of the status file. As shown in FIG. 3 (*a*), the status file may be used to maintain data sets for a distributed computer system and include information related to the Catalog dataset, for example, including, Catalog Status, Catalog Data Set Name, Catalog data set status, Alternative data set name, Alternative data set status, Maintain phase, CF list module status, wherein the Catalog Status can indicate whether the Catalog dataset is in a maintenance state or not, the Catalog Data Set Name can represent a name of the data set involved, Catalog data set status can represent a status (read-write or read-only) of the data set involved, Maintain phase can include a copy phase, a write-back phase, and a replay phase, as described in detail as below, CF list module status can represent a status (read-write or read-only) of the CF. Depending on the type of data, a corresponding status file may include information of more or less types of information deemed as needed, and the status file shown in FIG. 3 (*a*) is only an example, the data information can also be stored in other file forms or formats.

Next, during the copy phase, the data content(s) of the first data set can be copied from the first non-transient storage 201 to the second non-transient storage 202 in response to receiving the maintenance request (S3). According to an embodiment in the present disclosure, the first data set can include directory information for the data stored in a distributed computer system consisting of multiple computers, and the first data set can be locked to "read-only" status before being copied into the second non-transient storage 202. In this way, it will facilitate the consistency and integrity of the data set during maintenance.

Since the amount of data in the distributed computer system is very huge, directory information for all data in the distributed computer system may involve millions of pieces of data information, usually with a size of several GBs. Therefore, it may take some time for data migration of the directory information. Every request (e.g., a query request or update request) to the data of a distributed computer system may need to use the directory information as an index. However, during the maintenance of the directory information, it is impossible for existing maintenance methods to use the directory information to retrieve the expected data, which leads to an interruption of service. Under this circumstance, the user has to wait until the maintenance is completed and resend the request(s), resulting in low processing efficiency, and even worse, the request(s) received during the maintenance period may be missed in some cases, resulting in data consistency being damaged.

To address at least one of the problems stated above, data maintenance according to an embodiment in the present disclosure performs the following processes.

As shown in FIG. 2, during the copy phase, the host node 210 can receive an update request from a client device 220 (S4), and in response to receiving the update request, the host node 210 can store in-flight content(s) indicated by the received update request in the first transient memory 203 (S5). According to another embodiment of the present disclosure, one or more other nodes different from the host node 210 in the distributed computer system can also receive the update content(s) during the copy phase and store the update content(s) in the first transient memory 203.

In addition, according to an embodiment in the present disclosure, the update content(s) indicated by one or more update requests can be written/stored in the first non-transient storage 201, for example in the form of a list file. FIG. 3 (*b*) shows an example of the list file. As shown in FIG. 3 (*b*), the list file may include information related to the updates to the Catalog dataset as requested during the copy phase, for example, including, Data Set Name, Volume, Owner, Access time, VTOC, LENGTH, Other changed attributes, wherein the Data Set Name can represent a name of the data set involved, Volume can represent a location of the data set involved, Owner can represent a source that requests an update to data, VTOC can represent a volume table of contents, and LENGTH can represent the length of the data set involved. It should be noted that such status files may include information of more or less types of information deemed as needed, and the list file shown in FIG. 3 (*b*) is only an example, the update content(s) can also be stored in other file forms or formats.

According to an embodiment in the present disclosure, the update request to the first data set can indicate operations on the first data set including a modification of data content(s), a deletion of data content(s), a transfer of data content(s), and a creation of new data content(s) for the first data set. Optionally, the transient memory in the present disclosure can be configured redundantly, another transient memory 204 can also be included as an alternative transient memory in the system 20, and the update content(s) stored in the first transient memory 203 is copied into the second transient memory 204 (S6) to avoid data loss due to unexpected power failure or system corruption. It should be noted that the transient memory 204 is optional and may be omitted.

In addition, during the copy phase, the host node 210 can receive an query request from the client device 220 (S7), and in response to receiving the query request, the host node 210 can perform retrieval for content(s) indicated by the query request in the first transient memory 203 (S8), and if the content(s) indicated by the query request can be retrieved from the first transient memory 203, for example, the content(s) corresponds to at least a portion of the update content(s) stored in the first transient memory 203, the host node 210 can directly return the retrieved content(s) to the client device 220 (S10); whereas if the content(s) cannot be retrieved from the first transient memory 203, for example, the content(s) corresponds to the data stored in the first non-transient storage 201, the host node 210 can further retrieve the content(s) from the first non-transient storage 201 (S9), in response to the content(s) being not able to be retrieved from the first transient memory 203, and then return the retrieved content(s) to the client device 220 (S10). By performing the retrieval of content(s) in the first transient memory 203, the content(s) can be searched in the data containing the latest update content(s) such that the content(s) retrieved are more accurate (the latest). Also, the host node 210 can further perform the retrieval of content(s) in the second transient memory 204, when the second transient memory 204 is used as an alternative transient memory. According to another embodiment in the present disclosure, one or more other nodes different from the host node 210 in the distributed computer system can perform the retrieval of the content(s).

Thus, through the above processes according to an embodiment in the present disclosure, a query request from the client device can be received and responded to during the copy phase without interrupting services.

Upon completion of the copy phase, namely, all data or at least data to be maintained in the first non-transient storage 201 has been copied into the second non-transient storage 202, the host node 210 can switch the second data set in the second non-transient storage 202 into a "write-back phase", during which the update content(s) in the first transient memory 203 (or in the second transient memory 204) can be transferred to the second non-transient storage 202 (S11).

According to an embodiment in the present disclosure, the host node 210 can update the second data set stored in the second non-transient storage 202 based on the update content(s) stored in the first transient memory 203 or based on the alternative update content(s) stored in the second transient memory 204. For example, the update request received in the copy phase indicates a modification of the directory information stored in the first transient memory 203, and during the write-back phase, the second data set is modified based on the update content(s) indicated by the update request, to merge the update into the second data set.

In this way, in-flight changes to datasets received will be recorded in a transient memory during the copy phase and incorporated into a new storage after the data migration during the write-back phase, and thereby ensuring data consistency for the distributed computer system.

During the write-back phase, the host node 210 can receive one or more update requests or query requests from a client device 220 (S12), and according to an embodiment in the present disclosure, in response to receiving one or more such requests, instead of handling the received requests immediately in the write-back phase, the host node 210 intercepts the one or more such requests and generates a request list including the one or more such requests, and then write the generated request list in the first transient memory 203 (S13). Also, the generated request list can be written to another transient memory as an alternative, such as the second transient memory 204.

According to an embodiment in the present disclosure, the request list can be written/stored in the first transient memory 203 in the form of a request queue file. FIG. 3 (c) shows an example of the request queue file. As shown in FIG. 3 (c), the request queue file may include information related to one or more requests received during the write-back phase, for example, including, Request ID, Request connector, Request Package, Request time & timeout, etc., wherein the Request ID can represent a respective identifier for each request, Request connector can represent a source of the request, Request Package can include several types of request content(s) such as the name, location, type of the data set involved and so on, and Request time & timeout can represent the time when the request was issued and the timeout period. It should be noted that such a request queue file may include information of more or fewer types deemed as needed, and the request queue file shown in FIG. 3 (c) is only an example, the one or more requests can also be stored in other file forms or formats.

In response to completion of the write-back phase, namely, the second data set in the second non-transient storage 202 has been updated based on the update content(s), the host node 210 can switch the second data set in the second non-transient storage 202 into a "replay phase", during which the host node 210 can read the one or more requests included in the request list from the first transient memory 203 and perform corresponding actions according to the one or more requests to respond to the client device 220 (S14).

For, example, the host node 210 receives an update request to delete certain data from the data directory information during the write-back phase, and this update request is included in the request list and stored in the first transient memory 203. After the completion of the write-back phase, the host node 210 can read the update request and then update the second data set by deleting the data indicated by the update request during the replay phase. Alternatively, in response to receiving a query request during the write-back phase, the host node 210 can retrieve and return the content(s) from the second non-transient storage 202 during the replay phase.

So far, an exemplary process of data maintenance for the system 20 has been described with reference to FIG. 2 and FIG. 3, and the process as described above generally involves three phases, a copy phase, a write-back phase, and a replay phase, by which a method of copying key data without interrupting services can be achieved.

According to an embodiment in the present disclosure, the copy phase can be triggered by a receipt of a maintenance request for data stored in the system 20. During the copy phase, at least one of the processors 211 of the host node 210 can perform one of following actions by executing a set of computer program instructions stored in the program memory 212: copying the first data set from the first non-transient storage 201 into a second non-transient storage 202 as a second data set, wherein the first data set is locked to a read-only status before being copied into the second non-transient storage 202; in response to receiving an update request, writing update content(s) indicated by the update request to the first data set into the first transient memory 203; in response to receiving a query request, retrieving content(s) indicated by the query request from the first transient memory 203 and the first non-transient storage 201 in a specific order; and copying the update content(s) indicated by the update request stored in the first transient memory 203 into a second transient memory 204 separate from the first transient memory, wherein the update content(s) involve a modification of data content(s), a deletion of data content(s), a transfer of data content(s), and a creation of new data content(s) for the first data set, and so on. After the completion of the copy phase, the host node 210 can perform one or more actions for the write-back phase.

During the write-back phase, at least one of the processors 211 of the host node 210 can perform one of following actions by executing a set of computer program instructions stored in the program memory 212: updating the second data set stored in the second non-transient storage 202 based on the update content(s) stored in the first transient memory 203, for example, by transferring the update content(s) to the second non-transient storage 202; in response to receiving one or more requests, generating a request list including the received one or more requests, and writing the request list in the first transient memory 203 or the second transient memory 204. Upon the completion of the write-back phase, the host node 210 can perform one or more actions for the replay phase.

During the replay phase, at least one of the processors 211 of the host node 210 can perform one of the following actions by executing a set of computer program instructions stored in the program memory 212: reading the one or more requests included in the request list from the first transient memory 203, and processing the one or more requests with respect to the second data set stored in the second non-transient storage 202. Upon the completion of replay phase, all requests received during maintenance can be effectively responded to, and any updates to data can be merged into data sets stored in the new storage.

It should be understood that different phases may be marked by the status file of FIG. 3 (*a*) or may not be marked explicitly. For example, upon the completion of the copy phase, the host node 210 can update the second data set directly without switching the second data set into the "write-back phase".

In addition, operations S1-S14 as shown in FIG. 2 are described herein before in sequence. According to an embodiment in the present disclosure, sequences of some actions as described above are not necessarily fixed or in a fixed order and can be adjusted in some cases. For example, S9 can be before S8, or S6 can be performed at any appropriate time in the copy phase. Furthermore, some operations in the above-mentioned process of data maintenance may be optional or preferable, and part of the operations shown in FIG. 2 can constitute a complete process flow or a sub-flow of the whole maintenance process, for example, S1-S6 and S11 can be considered as a complete flow for data migration.

Through a method of data maintenance and a system using the method according to an embodiment in the present disclosure, any request from users or applications can be effectively processed during maintenance without interrupting services, and the data update during maintenance can also be synchronized to the data set stored in the new storage medium, thus ensuring the high reliability and high availability of data.

A computer-implemented method for data maintenance according to an embodiment in the present disclosure is described below with reference to FIGS. 4-5.

Figure 4:
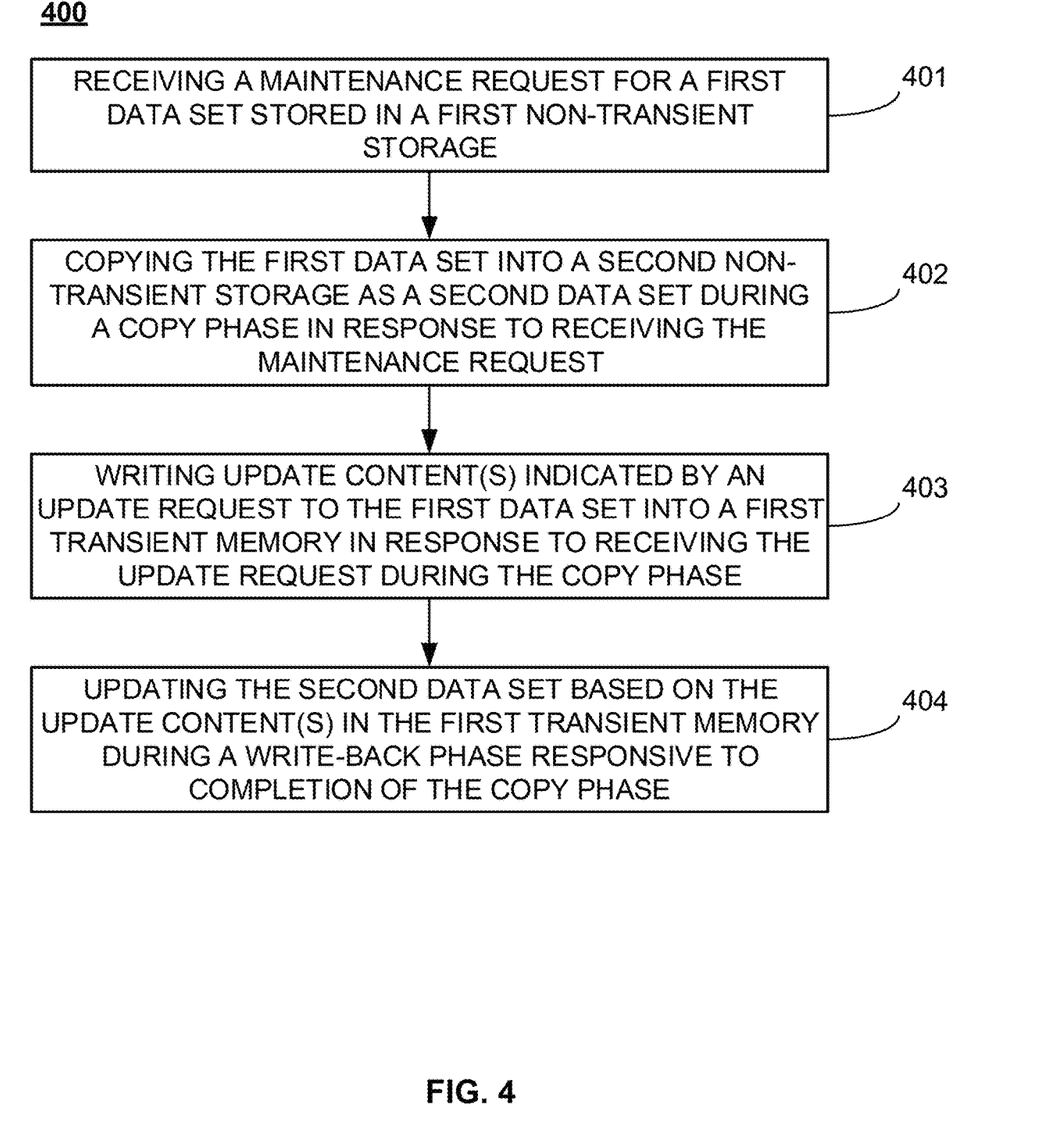
FIG. 4 is an operational exemplary flowchart of a computer-implemented method for data maintenance according to at least one embodiment in the present disclosure.

FIG. 4 shows a flowchart of a computer-implemented method 400 for data maintenance according to an embodiment in the present disclosure. As shown in FIG. 4, method 400 for data maintenance comprises steps 401-404. It should be noted that the method 400 may be executed in any of the environments described with reference to accompanying drawings according to an embodiment in the present disclosure. For example, each step of method 400 can be performed by one or more processing units in a system for data maintenance, such as central processing units (CPUs), and an exemplary architecture of the system for data maintenance has been described as above with reference to FIG. 2.

At step 401, a maintenance request for a first data set stored in a first non-transient storage can be received. According to an embodiment in the present disclosure, the data migration from the first non-transient storage to a new non-transient storage can be performed in response to the maintenance request for a first data set, and the first data set includes directory information for the data stored in a distributed computer system consisting of multiple computers. Example operation(s) related to this step can correspond to at least a part of the description for S1-S2 in FIG. 2 as above.

At step 402, the first data set is copied into a second non-transient storage as a second data set during a copy phase in response to receiving the maintenance request. According to an embodiment in the present disclosure, the first data set can be locked to read-only status before being copied into the second non-transient storage. Example operation(s) related to this step can correspond to at least a part of the description for S3-S4 in FIG. 2 as above.

At step 403, update content(s) indicated by an update request to the first data set is written into a first transient memory in response to receiving the update request during the copy phase. According to an embodiment in the present disclosure, the update request to the first data set indicates operations on the first data set including a modification of data content(s), a deletion of data content(s), and a creation of new data content(s) for the first data set. Additionally, during the copy phase, the update content(s) stored in the first transient memory can be copied into a second transient memory separate from the first transient memory. Example operation(s) related to this step can correspond to at least a part of the description for S5-S6 in FIG. 2 as above.

At step 404, the second data set is updated during a write-back phase after the completion of the copy phase, based on the update content(s) in the first transient memory. According to an embodiment in the present disclosure, the update content(s) received in the copy phase will be merged into the second non-transient storage. For, example, the update request received in the copy phase indicates a modification of the first data set, and during the write-back phase, the second data set is modified based on the update request. Example operation(s) related to this step can correspond to at least a part of the description for S11 in FIG. 2 as above.

Figure 5:
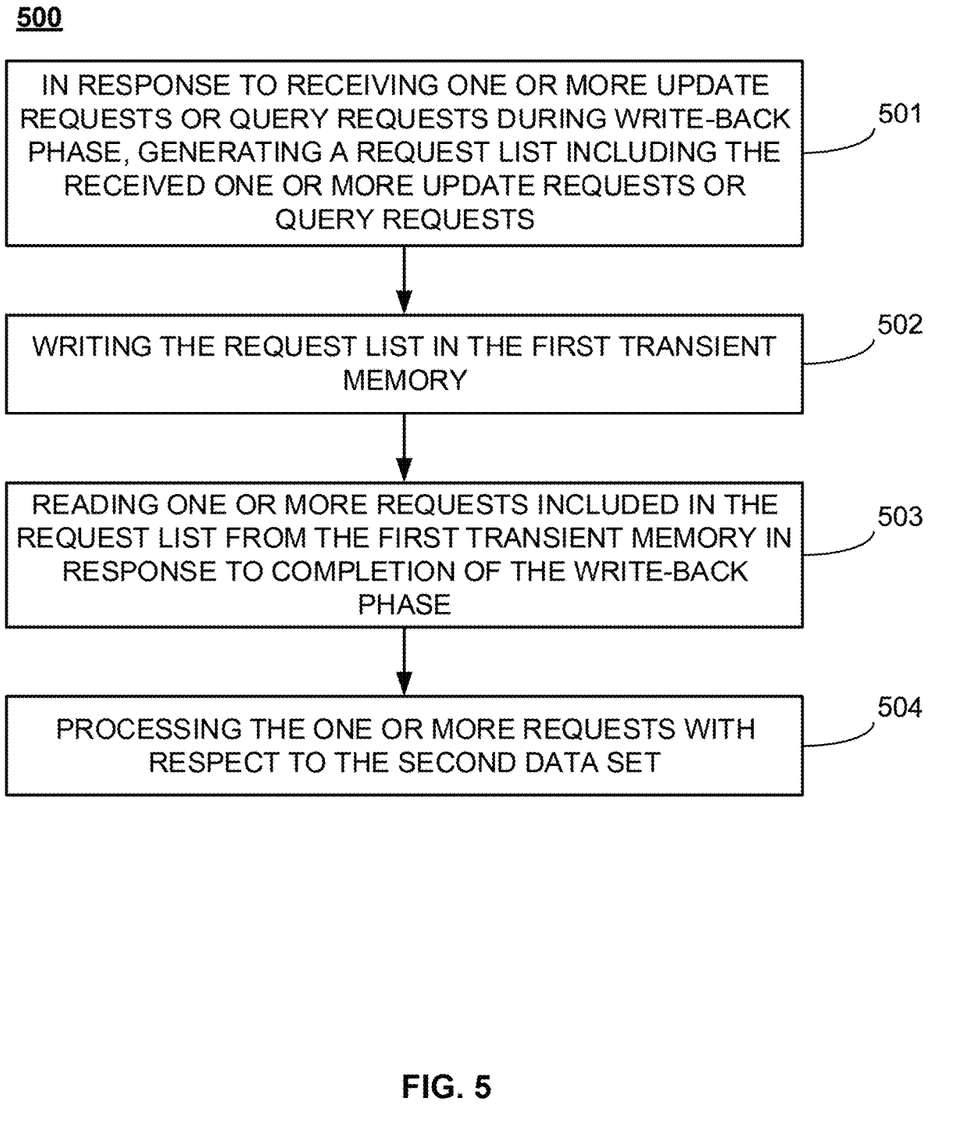
FIG. 5 is another operational exemplary flowchart of a computer-implemented method for data maintenance according to at least one embodiment in the present disclosure.

FIG. 5 shows another exemplary flowchart of a computer-implemented method 500 for data maintenance according to an embodiment in the present disclosure. The method 500 for data maintenance generally involves operations about handling the request(s) during the write-back phase, which can be occurred in the replay phase. As shown in FIG. 5, method 500 comprises steps 501-504.

At step 501, in response to receiving one or more update requests or query requests during the write-back phase, a request list including the received one or more update requests or query requests can be generated, for example, in a form of a request queue file.

At step 502, the request list can be written in the first transient memory.

At step 503, upon the completion of the write-back phase, the one or more requests included in the request list can be read out from the first transient memory, and at step 504, the one or more requests can be processed with respect to the second data set.

Example operations related to the above steps can correspond to at least a part of the description for S12-S14 in FIG. 2 as above.

Figure 6:
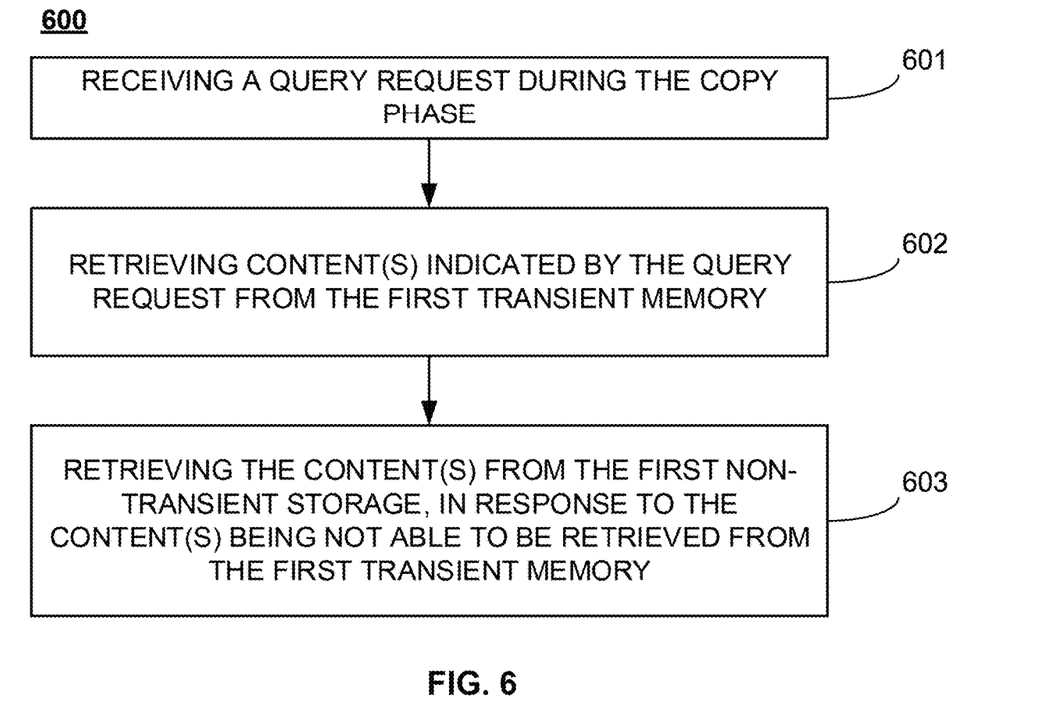
FIG. 6 is another operational exemplary flowchart of a computer-implemented method for data maintenance according to at least one embodiment in the present disclosure.

FIG. 6 shows another exemplary flowchart of a computer-implemented method 600 for data maintenance according to an embodiment in the present disclosure. The method 600 for data maintenance generally involves operations about handling the requests during the copy phase. As shown in FIG. 6, method 600 comprises steps 601-603.

At step 601, a query request can be received during the copy phase.

At step 602, in response to receiving the query request during the copy phase, the retrieval of content(s) indicated by the query request can be performed in the first transient memory.

At step 603, in response to the content(s) not being able to be retrieved from the first transient memory, the retrieval of the content(s) indicated by the query request can be performed in the first non-transient storage.

Example operations related to the above steps can correspond to at least a part of the description for S7-S10 in FIG. 2 as above.

Figure 7:
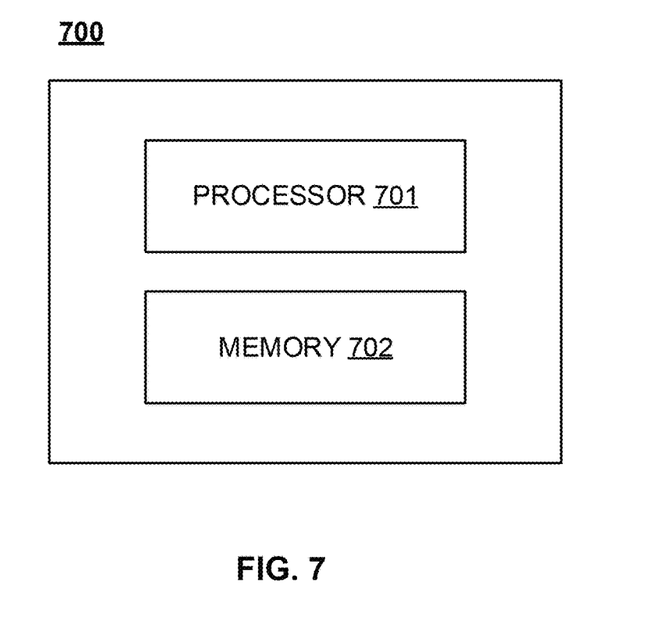
FIG. 7 illustrates a system for data maintenance according to at least one embodiment in the present disclosure.

FIG. 7 shows a system for data maintenance according to an embodiment in the present disclosure. The system 700 for data maintenance comprises one or more processors 701 and a memory 702 coupled to at least one of the processors 701.

According to an embodiment in the present disclosure, a set of computer program instructions stored in the memory, which, when executed by at least one of the processors, perform actions of: receiving a maintenance request for a first data set stored in a first non-transient storage; copying the first data set into a second non-transient storage as a second data set during a copy phase in response to receiving the maintenance request; writing update content(s) indicated by an update request to the first data set into a first transient memory in response to receiving the update request during the copy phase; and updating the second data set based on the update content(s) in the first transient memory during a write-back phase after the completion of the copy phase.

According to an embodiment in the present disclosure, the set of computer program instructions, when executed by at least one of the processors, further perform actions during the copy phase of: retrieving the content(s) indicated by a query request from the first transient memory in response to receiving the query request during the copy phase; and retrieving the content(s) indicated by the query request from the first non-transient storage in response to the content being not able to be retrieved from the first transient memory.

According to an embodiment in the present disclosure, the set of computer program instructions, when executed by at least one of the processors, further perform actions during the copy phase of: copying the update content(s) stored in the first transient memory into a second transient memory separate from the first transient memory.

According to an embodiment in the present disclosure, the first data set is locked to read-only status before being copied into the second non-transient storage.

According to an embodiment in the present disclosure, the update request to the first data set indicates operations on the first data set including a modification of data content(s), a deletion of data content(s), a transfer of data content(s), and a creation of new data content(s) for the first data set.

In addition, according to another embodiment of the present disclosure, a computer program product for data maintenance is disclosed. As an example, the computer program product comprises a non-transitory computer-readable storage medium having program instructions embodied therewith, and the program instructions are executable by a processor. When executed, the program instructions cause the processor to perform one or more of the above-described procedures, and details are omitted herein for conciseness.

It should be noted that the processing of data maintenance or data maintenance achieved by a computer program product according to embodiments of this disclosure could be implemented in the computing environment of FIG. 1.

The present disclosure may be a system, a method, and/or a computer program product at any possible technical detail level of integration. The computer program product may include a computer-readable storage medium (or media) having computer-readable program instructions thereon for causing a processor to carry out aspects of the present disclosure.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for uninterrupted performance of data maintenance over a distributed computer system, the method comprising:
   receiving, by one or more processing units, a maintenance request for a first data set stored in a first non-transient storage;
   copying, by the one or more processing units, the first data set into a second non-transient storage as a second data set during a copy phase in response to receiving the maintenance request;
   writing, by the one or more processing units, update content indicated by an update request to the first data set into a first transient memory in response to receiving the update request during the copy phase;
   updating, by the one or more processing units, the second data set based on the written update content in the first transient memory during a write-back phase responsive to a completion of the copy phase;
   in response to receiving one or more update requests and/or one or more query requests during the write-back phase, generating, by the one or more processing units, a request list including the received one or more update requests and/or the received one or more query requests;

writing, by the one or more processing units, the request list in the first transient memory;

reading, by the one or more processing units, the one or more update requests and/or the one or more query requests included in the request list from the first transient memory in response to completion of the write-back phase; and processing, by the one or more processing units, the one or more update requests and/or the one or more query requests with respect to the second data set.

2. The computer-implemented method of claim 1, wherein during the copy phase, further comprising:

retrieving, by the one or more processing units, content indicated by a query request from the first transient memory in response to receiving the query request during the copy phase; and retrieving, by the one or more processing units, the content indicated by the query request from the first non-transient storage in response to the content not being able to be retrieved from the first transient memory.

3. The computer-implemented method of claim 1, wherein during the copy phase, further comprising:

copying, by the one or more processing units, the written update content stored in the first transient memory into a second transient memory separate from the first transient memory.

4. The computer-implemented method of claim 1, wherein the first data set is locked to read-only status before being copied into the second non-transient storage.

5. The computer-implemented method of claim 1, wherein the first data set includes directory information for data stored in a distributed system consisting of multiple computers.

6. The computer-implemented method of claim 1, wherein the update request to the first data set indicates operations on the first data set including a modification of data content, a deletion of data content, a transfer of data content, and a creation of new data content for the first data set.

7. A distribution computer system for uninterrupted performance of data maintenance over the distributed computer system, the computer system comprising:

one or more processors, one or more computer-readable memories, one or more computer-readable tangible storage medium, one or more computers, and program instructions stored on at least one of the one or more tangible storage medium for execution by at least one of the one or more memories, wherein the computer system is capable of performing a method comprising:

receiving a maintenance request for a first data set stored in a first non-transient storage;

copying the first data set into a second non-transient storage as a second data set during a copy phase in response to receiving the maintenance request;

writing update content indicated by an update request to the first data set into a first transient memory in response to receiving the update request during the copy phase;

updating the second data set based on the written update content in the first transient memory during a write-back phase responsive to a completion of the copy phase;

in response to receiving one or more update requests and/or one or more query requests during the write-back phase, generating, a request list including the received one or more update requests and/or the received one or more query requests;

writing the request list in the first transient memory;

reading the one or more update requests and/or the one or more query requests included in the request list from the first transient memory in response to completion of the write-back phase; and processing the one or more update requests and/or the one or more query requests with respect to the second data set.

8. The computer system of claim 7, wherein during the copy phase, further comprising:

retrieving content indicated by a query request from the first transient memory in response to receiving the query request during the copy phase; and retrieving the content indicated by the query request from the first non-transient storage in response to the content not being able to be retrieved from the first transient memory.

9. The computer system of claim 7, wherein during the copy phase, further comprising:

copying, by the one or more processing units, the written update content stored in the first transient memory into a second transient memory separate from the first transient memory.

10. The computer system of claim 7, wherein the first data set is locked to read-only status before being copied into the second non-transient storage.

11. The computer system of claim 7, wherein the first data set includes directory information for data stored in a distributed system consisting of multiple computers.

12. The computer system of claim 7, wherein the update request to the first data set indicates operations on the first data set including a modification of data content, a deletion of data content, a transfer of data content, and a creation of new data content for the first data set.

13. A computer program product for uninterrupted performance of data maintenance over a distributed computer system, the computer program product comprising:

one or more non-transitory computer-readable tangible storage medium and program instructions stored on at least one of the one or more tangible storage medium, the program instructions executable by a processor to cause the processor to perform a method comprising:

receiving a maintenance request for a first data set stored in a first non-transient storage;

copying the first data set into a second non-transient storage as a second data set during a copy phase in response to receiving the maintenance request;

writing update content indicated by an update request to the first data set into a first transient memory in response to receiving the update request during the copy phase;

updating the second data set based on the written update content in the first transient memory during a write-back phase responsive to a completion of the copy phase;

in response to receiving one or more update requests and/or one or more query requests during the write-back phase, generating, a request list including the received one or more update requests and/or the received one or more query requests;

writing the request list in the first transient memory;

reading the one or more update requests and/or the one or more query requests included in the request list from the first transient memory in response to completion of the write-back phase; and processing the one or more update requests and/or the one or more query requests with respect to the second data set.

14. The computer program product of claim 13, further comprising:
   retrieving content indicated by a query request from the first transient memory in response to receiving the query request during the copy phase; and
   retrieving the content indicated by the query request from the first non-transient storage in response to the content not being able to be retrieved from the first transient memory.

15. The computer program product of claim 13, further comprising:
   copying, by the one or more processing units, the written update content stored in the first transient memory into a second transient memory separate from the first transient memory.

16. The computer program product of claim 13, wherein the first data set is locked to read-only status before being copied into the second non-transient storage, and the first data set includes directory information for data stored in a distributed system consisting of multiple computers.

17. The computer program product of claim 13, wherein the update request to the first data set indicates operations on the first data set including a modification of data content, a deletion of data content, a transfer of data content, and a creation of new data content for the first data set.

* * * * *